(12) United States Patent
Rynberk, Jr.

(10) Patent No.: US 9,980,441 B2
(45) Date of Patent: May 29, 2018

(54) LANDSCAPE EDGING STAKE AND METHOD

(71) Applicant: Valley View Industries, Crestwood, IL (US)

(72) Inventor: Howard Rynberk, Jr., Homer Glen, IL (US)

( * ) Notice: Subject to any disclaimer, the term of this patent is extended or adjusted under 35 U.S.C. 154(b) by 0 days. days.

(21) Appl. No.: 15/435,761

(22) Filed: Feb. 17, 2017

(65) Prior Publication Data

US 2017/0233973 A1 Aug. 17, 2017

Related U.S. Application Data

(60) Provisional application No. 62/296,380, filed on Feb. 17, 2016.

(51) Int. Cl.
| | |
|---|---|
| *A01G 1/08* | (2006.01) |
| *A01G 9/12* | (2006.01) |
| *E01C 11/22* | (2006.01) |
| *E02D 5/80* | (2006.01) |
| *E01C 19/52* | (2006.01) |

(52) U.S. Cl.
CPC ............ *A01G 9/28* (2018.02); *A01G 1/08* (2013.01); *A01G 9/122* (2013.01); *E01C 11/221* (2013.01); *E01C 19/52* (2013.01); *E02D 5/80* (2013.01); *E02D 5/801* (2013.01)

(58) Field of Classification Search
CPC ......... E01C 19/52; E01C 11/221; A01G 1/08; A01G 9/122; A01G 17/14; E02D 5/80; E04H 12/2215; E04H 12/2223
See application file for complete search history.

(56) References Cited

U.S. PATENT DOCUMENTS

| 844,294 | A | * | 2/1907 | Winslow | E02D 5/80 |
| | | | | | 52/155 |
| 3,545,128 | A | * | 12/1970 | La Fontaine | A01G 1/08 |
| | | | | | 428/131 |
| 4,967,522 | A | * | 11/1990 | Keen | A01G 1/08 |
| | | | | | 404/7 |
| 6,071,038 | A | * | 6/2000 | Strobl, Jr. | E01C 11/221 |
| | | | | | 404/7 |
| 6,379,078 | B1 | * | 4/2002 | Zwier | E01C 11/08 |
| | | | | | 404/4 |
| 7,322,773 | B1 | * | 1/2008 | Cooper | E04H 12/2223 |
| | | | | | 405/36 |

(Continued)

FOREIGN PATENT DOCUMENTS

| DE | 3634266 A1 * | 4/1988 | ......... E04H 12/2223 |
| DE | 29503115 U1 * | 4/1995 | ............. E02D 5/801 |

(Continued)

*Primary Examiner* — Adriana Figueroa
*Assistant Examiner* — Jessie T Fonseca
(74) *Attorney, Agent, or Firm* — Cook Alex Ltd.; R. Blake Johnston

(57) ABSTRACT

A landscape edging stake includes a driving end, a penetration end and an edging engagement portion positioned between the driving end and the penetration end. The edging engagement portion includes a rib configured to engage an inner wall of an anchoring bore of an edging link. A ground engagement portion is positioned between the edging engagement portion and the penetration end and includes a helical groove or thread.

5 Claims, 5 Drawing Sheets

(56) References Cited

U.S. PATENT DOCUMENTS

| | | | | |
|---|---|---|---|---|
| D615,673 S | * | 5/2010 | Flynn | D25/164 |
| D617,012 S | * | 6/2010 | Flynn | D25/164 |
| 8,915,027 B1 | * | 12/2014 | Alfieri, III | E01C 11/221 |
| | | | | 404/47 |
| 2002/0104260 A1 | * | 8/2002 | Allen | A01G 1/08 |
| | | | | 47/33 |
| 2002/0112415 A1 | * | 8/2002 | Eakin | A01G 1/08 |
| | | | | 52/102 |
| 2003/0024157 A1 | * | 2/2003 | Conde | A01G 1/08 |
| | | | | 47/33 |
| 2004/0237391 A1 | * | 12/2004 | English | A01G 1/08 |
| | | | | 47/33 |
| 2008/0163566 A1 | * | 7/2008 | Bella | E01C 11/221 |
| | | | | 52/102 |
| 2008/0235921 A1 | * | 10/2008 | Zwier | A01G 1/08 |
| | | | | 24/545 |
| 2009/0013597 A1 | * | 1/2009 | Orton | A01G 1/08 |
| | | | | 47/33 |
| 2009/0016849 A1 | * | 1/2009 | Riccobene | A01G 1/08 |
| | | | | 411/496 |
| 2010/0186293 A1 | * | 7/2010 | Flynn | A01G 1/08 |
| | | | | 47/33 |
| 2012/0153099 A1 | * | 6/2012 | Wesolik | F16M 9/00 |
| | | | | 248/156 |
| 2014/0259902 A1 | * | 9/2014 | Friederichs | A01G 1/08 |
| | | | | 47/33 |
| 2015/0034731 A1 | * | 2/2015 | Jackson | E01B 9/06 |
| | | | | 238/372 |
| 2016/0286730 A1 | * | 10/2016 | Holsworth | A01G 1/08 |

FOREIGN PATENT DOCUMENTS

| | | | | |
|---|---|---|---|---|
| DE | 29704452 U1 | * | 7/1998 | E04F 13/0807 |
| DE | 19705202 A1 | * | 8/1998 | E04F 13/0807 |
| DE | 202012102509 U1 | * | 10/2012 | |

* cited by examiner

LANDSCAPE EDGING STAKE AND METHOD

CLAIM OF PRIORITY

This application claims the benefit of U.S. Provisional Application No. 62/296,380, filed Feb. 17, 2016, the contents of which are hereby incorporated by reference.

FIELD OF THE INVENTION

The present invention relates generally to landscape edging and, more particularly, to a stake and method for installing and securing landscape edging.

BACKGROUND

Landscape edging finds a wide range of uses by consumers and in the landscape industry. Common uses include separating decorative landscaping fill, such as mulch, bark, sand or gravel from other ground covering, such as a lawn. Other uses for landscape edging include providing a decorative border along driveways or sidewalks and around trees, bushes, planting beds or gardens and the like. Landscape edging may also be used to secure bricks or patio pavers in place, forming an edge between a patio, sidewalk or driveway and another ground covering such a lawn.

Landscape edging often comes in elongated strips that feature an L-shaped cross section where the vertical wall portion provides a vertical barrier for dividing the landscape fill from the lawn or other ground covering. The horizontal base portion of the edging includes holes through which anchor stakes pass into the ground to secure the edging in place. Such edging is often molded from a plastic material.

Another type of edging growing in popularity is modular edging that features a number of decorative block or link structures that feature an anchoring tab or similar structure at each end. Each block or link may be, as an example only, approximately twelve inches long. Each anchoring tab features an opening or anchoring bore there through with the anchoring tab positioned higher on one end than on the other. As a result, the links or blocks may be positioned end to end with the anchoring tabs in an overlaying configuration. Anchor stakes may be driven through the overlaying openings of the neighboring links or blocks and into the ground so that the links or blocks are secured together in a chain-like fashion. Such edging provides great flexibility in that curves may be easily accommodated and the links or blocks may be molded in a variety of decorative styles. Furthermore, the links or blocks may be molded from a variety of materials. Indeed, it has become increasingly common to mold the blocks from recycled material such as shredded rubber.

An anchor stake typically features a pointed penetration end that facilitates driving the stake into the ground and an enlarged head portion that with a top surface that the user pounds with a hammer or the like to drive the stake into the ground. When fully driven into the ground, the bottom surface of the head engages the top surface of the area surrounding the hole in the edging.

Various forces operate to urge landscape edging stakes out of the ground. These include people or animals inadvertently stepping on the edging, lawn equipment running on top of or over the edging and accidental contact with the edging by landscaping tools. In addition, the landscape fill being contained by the edging may become saturated with water so that a greater force is exerted on one side of the edging than on the other. Furthermore, freezing and thawing of the ground soil causes frost heave which may push stakes out of the ground.

In view of the above, landscape edging stakes have been developed featuring smooth spiral twists or helical grooves or threads. Such stakes, however, are too easily twisted out of the ground over time due to frost heave. In addition, stakes with circumferential ribs, where the ribs features horizontal top and bottom surfaces, have been developed. Such ribs, however, are also too easily pushed up out of the ground as the soil, due to frost heave, pushes up on the generally horizontal bottom surfaces of the ribs.

A need exists for a landscape edging stake and method that more securely anchors modular landscape edging in place.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a landscape edging stake includes a driving end, a penetration end and an edging engagement portion. The edging engagement portion is positioned between the driving end and the penetration end and includes a rib configured to engage an inner wall of an anchoring bore of an edging link. A ground engagement portion is positioned between the edging engagement portion and the penetration end and includes a helical groove or thread.

In another aspect, a method is provided for securing a landscape edging link to the ground, where the link includes an anchoring bore. The method includes the steps of providing a stake, where the stake features a driving end, a penetration end, an edging engagement portion adapted to engage an inner surface of the anchoring bore and a ground engagement portion including a helical groove or thread, positioning the penetration end of the stake through the anchoring bore of the edging link and into the ground and driving the penetration end and the ground engagement portion into the ground so that the helical groove or thread engages the ground, and the rib of the edging engagement portion engages the inner surface of the anchoring bore, so that the stake resists twisting up out of the ground due to upward forces on the stake.

DETAILED DESCRIPTION OF EMBODIMENTS

An embodiment of the landscape edging stake of the present disclosure is indicated in general at 10 in FIGS. 1-5. While the stake is shown as featuring a generally round cross section, alternative cross sectional shapes may be used. As an example only, the stake is approximately nine inches long.

As illustrated in FIGS. 1-3 and 5, the penetration end of the stake is provided with a pointed tip 12 to facilitate driving the stake into the ground. At the opposite end of the stake, i.e. the driving end, a disk-shaped head portion 14 is provided (FIGS. 1-4 and 6). The head portion 14 has a diameter that is larger than the cross sectional diameter of the remaining portion of the stake 10.

Figure 6:
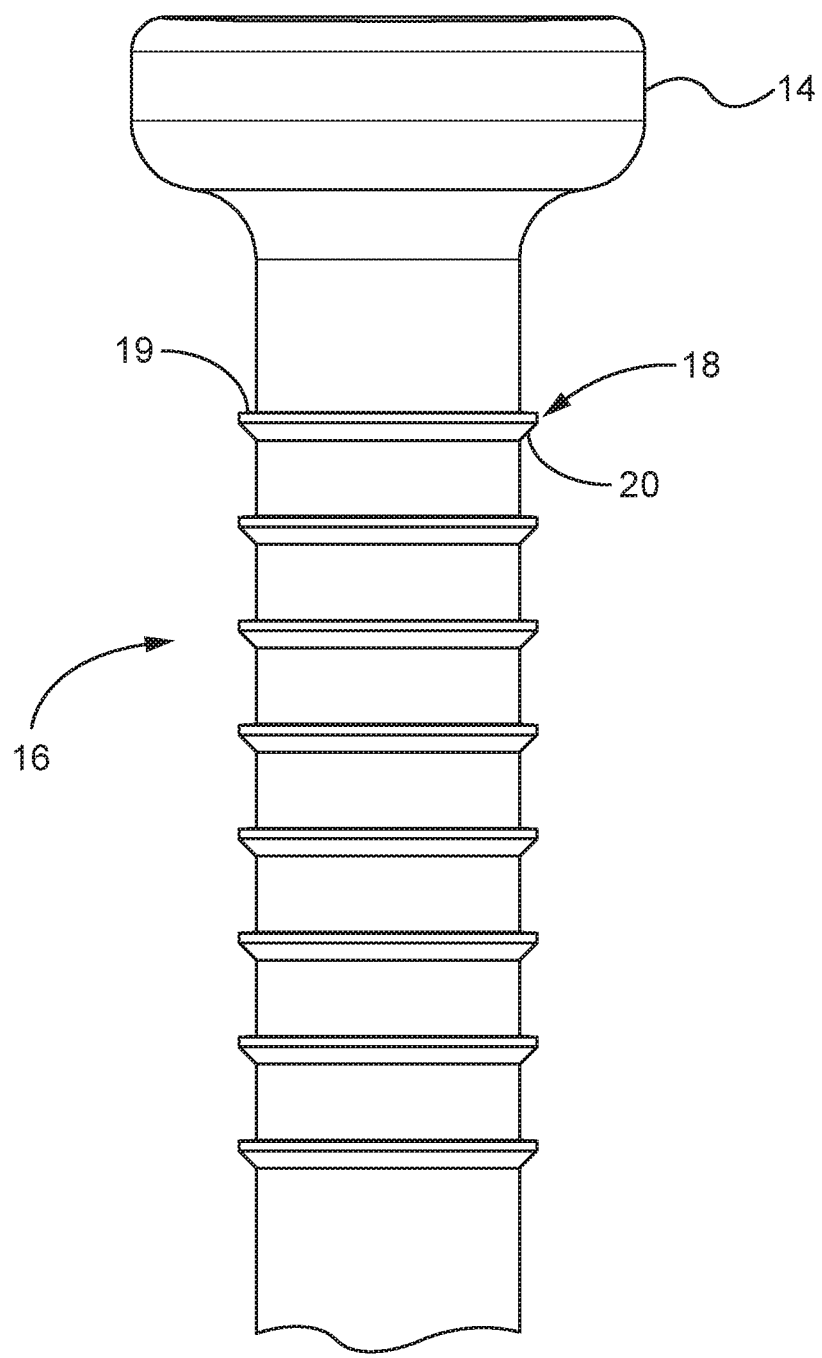
FIG. 6 is an enlarged elevational view of the edging engagement portion and the head of the landscape edging stake of FIGS. 1-5.

Positioned between the penetration end and the driving end are ground engagement and edging engagement portions. More specifically, adjacent to the head portion 14 is the edging engagement portion, indicated in general at 16. The edging engagement portion is provided with a series of ribs 18. As illustrated in FIG. 6, each rib 18 has a general flat top surface 19 and an outwardly and upwardly inclined bottom surface 20. It should be noted that while eight ribs 18 are illustrated, an alternative number may be used.

Figure 1:
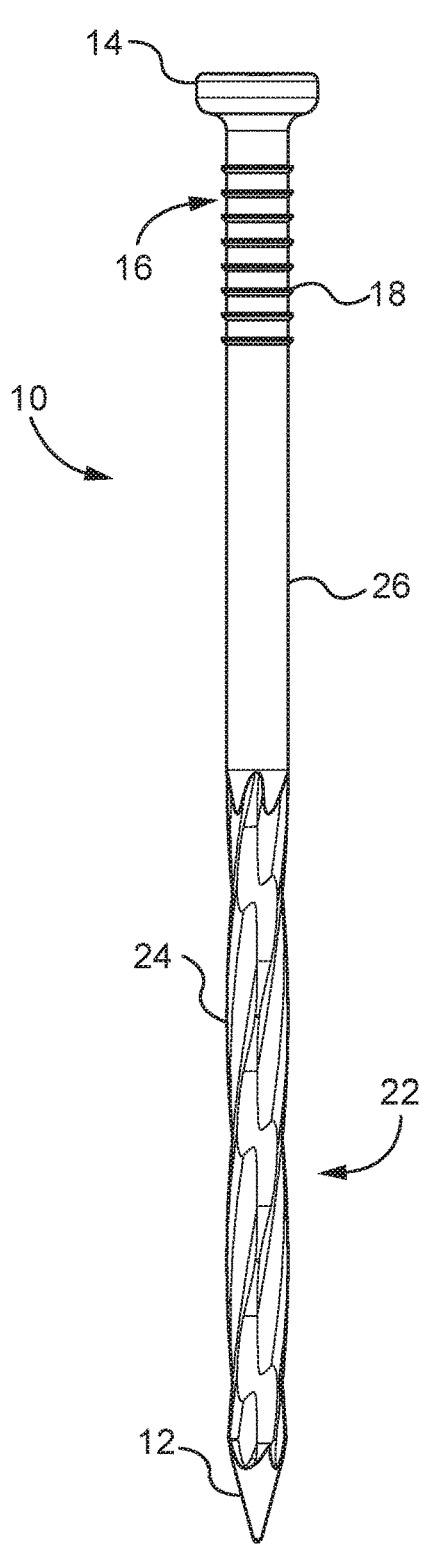
FIG. 1 is an elevational view of a first side of an embodiment of the landscape edging stake of the disclosure.
Figure 2:
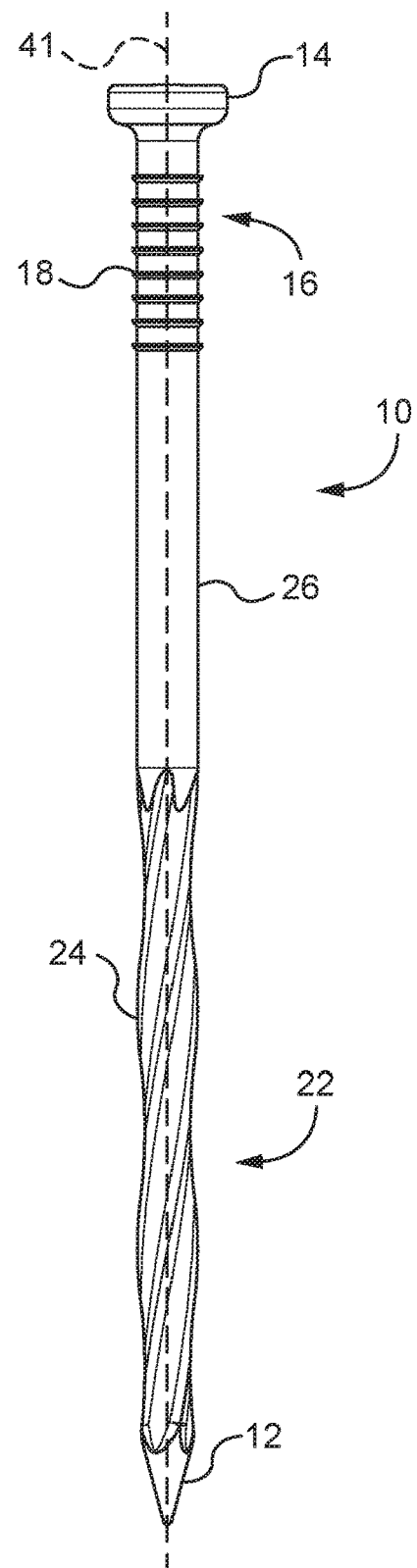
FIG. 2 is an elevational view of a second side of the landscape edging stake of FIG. 1.
Figure 3:
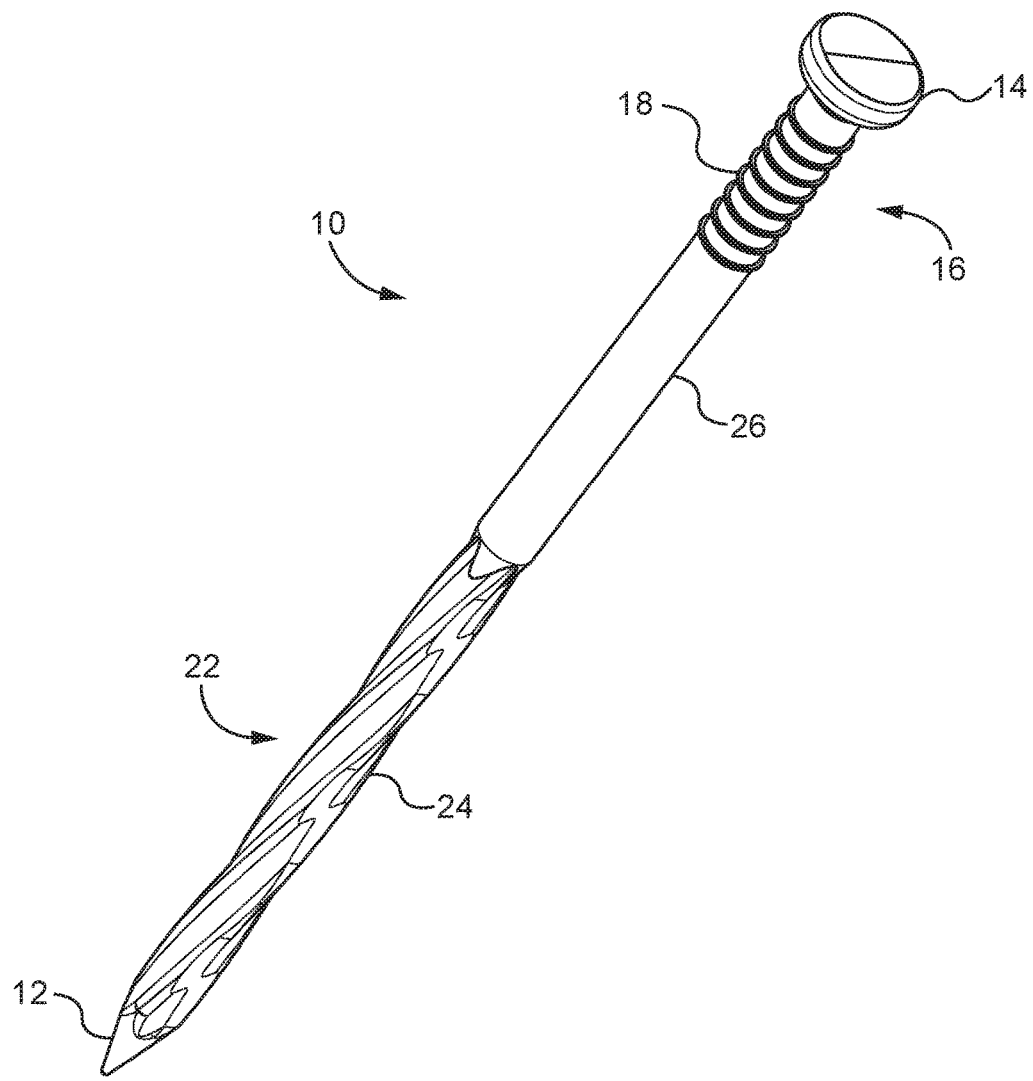
FIG. 3 is a perspective view of the landscape edging stake of FIGS. 1 and 2.
Figure 4:
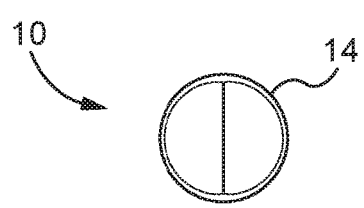
FIG. 4 is a top plan view of the landscape edging stake of FIGS. 1-3.
Figure 5:
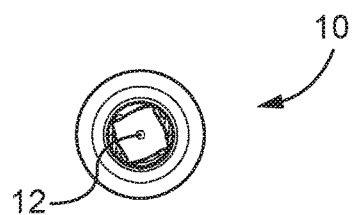
FIG. 5 is a bottom plan view of the landscape edging stake of FIGS. 1-4.

As illustrated in FIGS. 1-3, adjacent to the pointed tip 12 at the penetration end of the stake is the ground engagement portion, indicated in general at 22. The engagement portion is provided with generally helical threads or grooves 24.

Positioned between edging engagement portion 16 and the ground engagement portion 22 is a cylindrical intermediate surface 26.

The stake 10 of FIGS. 1-5 is preferably constructed from injection molded plastic, but it may alternatively be formed from other materials using other methods known in the art.

Figure 7:
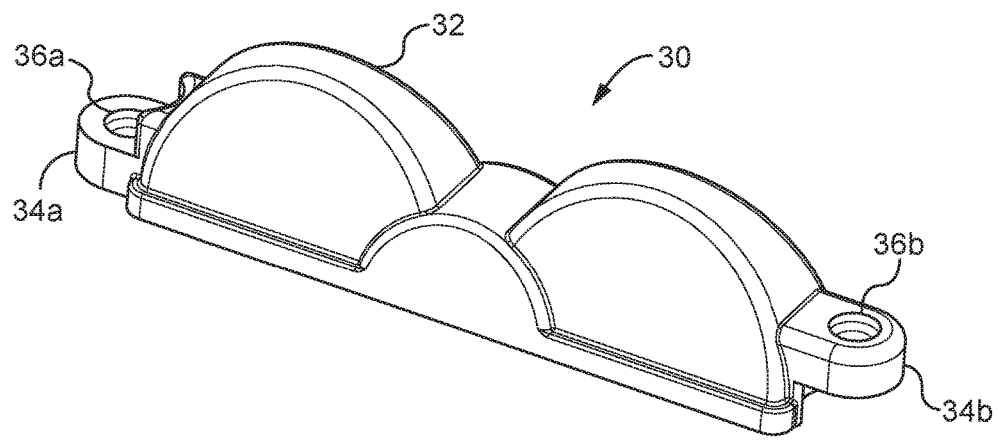
FIG. 7 is a perspective view of a landscape edging link suitable for use with the landscape edging stake of the disclosure.

Turning to FIG. 7, a link of a modular edging system is indicated in general at 30. The link has a decorative body portion 32 and a pair of anchoring tabs 34a and 34b formed one on each end. The bottom of the body portion is flat so as to easily rest on a surface, such as the surface of the ground. The anchoring tabs 34a and 34b are provided with anchoring bores 36a and 36b. The link is preferably formed from a rubber material, but may alternatively be formed from plastic or other materials.

Figure 8:
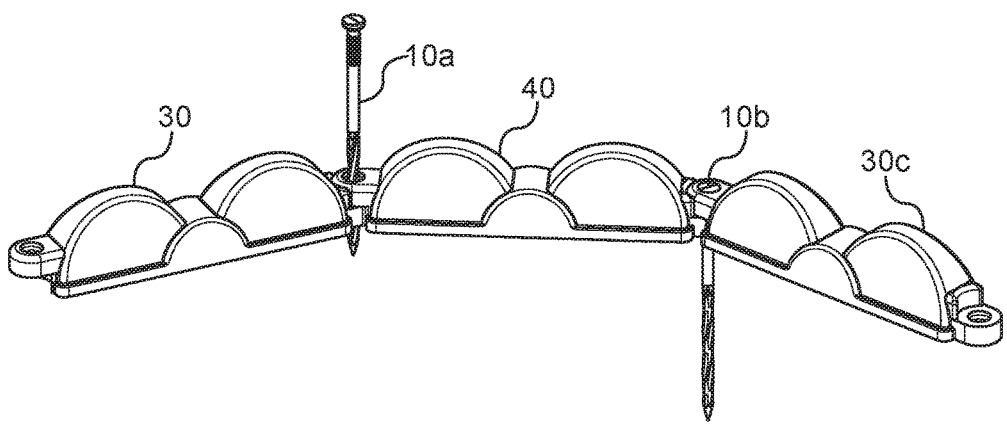
FIG. 8 is a perspective view illustrating the stake of FIGS. 1-5 being used to secure a number of landscape edging links of the type illustrated in FIG. 7 together.

Tab 34b is positioned higher than tab 34a and is spaced from the bottom of the link so that the tab of a neighboring link (corresponding to tab 34a) may be positioned under tab 34b with the anchor openings or bores in alignment. This is illustrated for links 30 and 40 of FIG. 8. With the links so positioned, the penetration end of stake 10a may be inserted through the aligned tab openings (as illustrated in FIG. 8). The stake may then be driven into the ground by an installer using a hammer to pound on the head 14 of the stake until the stake is fully driven into the ground, as illustrated by stakes 10a (partially installed) and 10b (fully installed) in FIG. 9. As the stake is driven into the ground, the helical grooves (24 in FIGS. 1-3 and 24a and 24b in FIG. 9) in the ground engagement portion of the stake will cause the stake to rotate slightly about the longitudinal axis of the stake, illustrated in phantom at 41 in FIG. 2.

Figure 9:
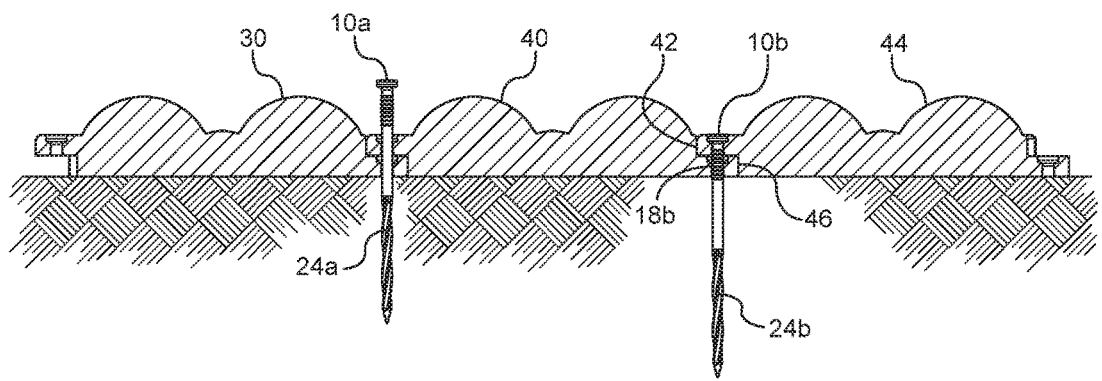
FIG. 9 is a cross-sectional view of landscape edging links being secured together and into the ground using the stake of FIGS. 1-5.

As illustrated in FIG. 9 for stake 10b, the ribs 18b of the stake engage the inner surface of the anchoring bores formed through anchoring tabs 42 (of edging link 44) and 46 (of edging link 40). More specifically, the cross sectional diameters of the ribs 18b are preferably sized so that they circumferentially engage the inner surface of each anchoring bore so that turning of the stake is resisted. As a result, the engagement of the ribs 18b by the anchoring bores inhibits the ability of the stake to twist about its longitudinal axis, and thus the stakes are resistant to being twisted out of the ground due to frost heave and upward forces acting on the edging.

As described previously with regard to FIG. 6, each of the ribs 18 of the engagement portion of the stake is provided with an upwardly and outwardly inclined bottom surface (20 in FIG. 6). This construction facilitates insertion of the ribs through the corresponding anchoring bores of the edging during installation. The flat top edges (19 in FIG. 6) of the ribs increase the difficulty in the stakes being pushed up through the anchoring bores.

In addition, as illustrated for stake 10b in FIG. 9, the bottom-most ribs 18b of the stake may optionally enter the ground. If this occurs, the upwardly and outwardly inclined bottom surfaces of the bottom-most ribs 18b reduce the effective forces pushing up on the ribs due to frost heave.

While the preferred embodiments of the invention have been shown and described, it will be apparent to those skilled in the art that changes and modifications may be made therein without departing from the spirit of the invention, the scope of which is defined by the following claims.

What is claimed is:

1. A method for securing a first landscape edging link to the ground, where the link includes an anchoring tab having a first anchoring bore, comprising the steps of:
   a. providing a stake featuring a driving end, a penetration end, an edging engagement, portion including at least one rib adapted to engage an inner surface of the first anchoring bore and a ground engagement portion including a helical groove or thread;
   b. positioning the penetration end through the first anchoring bore of the first edging link and into the ground;
   c. driving the penetration end and the ground engagement portion into the ground so that the helical groove or thread engages the ground and the at least one rib of the edging engagement portion engages an inner surface of the first anchoring bore so that the stake resists twisting up out of the ground due to upward forces on the stake.

2. The method of claim 1 wherein step c. includes engaging the inner surface of the first anchoring bore with multiple ribs.

3. The method of claim 1 further comprising the step of placing an anchoring tab of an additional adjacent landscape edging link, where the anchoring tab of the additional landscape edging link includes an additional anchoring bore having an inner surface, in overlaying relationship with the anchoring tab of the first landscape edging link so that the first and additional anchoring bores overlay one another to provide combined anchoring bores so that the at least one rib comprising a plurality of ribs engages the inner surfaces of both the first and additional anchoring bores of the combined anchoring bores.

4. The method of claim 1 wherein the landscape edging link includes a second anchoring bore and further comprising the steps of:

d. providing a second stake featuring a driving end, a penetration end, an edging engagement portion adapted to engage an inner surface of the second anchoring bore and a ground engagement portion including a helical groove or thread;
e. positioning the penetration end of the second stake through the second anchoring bore of the edging link and into the ground;
f. driving the penetration end of the second stake and the ground engagement portion of the second stake into the ground so that the helical groove or thread of the second stake engages the ground and a rib of the edging engagement portion of the second stake engages the inner surface of the second anchoring bore so that the second stake resists twisting up out of the ground due to upward forces on the second stake.

5. The method of claim 4 wherein step f. includes engaging the inner surface of the second anchoring bore with multiple ribs of the second stake.

* * * * *